United States Patent [19]

Busick

[11] 4,135,364
[45] Jan. 23, 1979

[54] AIR LIFT PUMP ENERGY CONVERSION APPARATUS

[76] Inventor: Eugene D. Busick, 158 N. 110 St., Miami, Fla. 33161

[21] Appl. No.: 859,807

[22] Filed: Dec. 12, 1977

[51] Int. Cl.² .......................... F16D 31/06; F04F 1/18
[52] U.S. Cl. ........................................ 60/325; 60/327; 290/54; 417/108
[58] Field of Search ................ 60/325, 326, 327, 398; 137/154, 155; 261/35; 290/43, 54; 417/108, 109

[56] References Cited

U.S. PATENT DOCUMENTS

| 487,639 | 12/1892 | Pohle | 417/108 |
|---|---|---|---|
| 932,934 | 8/1909 | Wood | 417/108 |
| 1,276,373 | 8/1918 | Jones | 417/109 |
| 2,983,229 | 5/1961 | Went | 417/109 |
| 3,870,893 | 3/1975 | Mattera | 290/53 |
| 3,988,897 | 11/1976 | Strub | 60/398 X |

Primary Examiner—Edgar W. Geoghegan
Attorney, Agent, or Firm—Oltman and Flynn

[57] ABSTRACT

This apparatus has a plurality of vertical lift tubes immersed in water and arranged to discharge water into a hood at their upper ends for driving a turbine-like fluid motor. Each lift tube receives a much shorter, smaller diameter inner tube at its lower end. A horizontal partition extends between the inside of each lift tube and the corresponding inner tube. Compressed air is introduced periodically into the annular space between the lift tube and its inner tube below this partition. The lift tube has a water inlet opening located above the partition and below the top of its inner tube.

12 Claims, 7 Drawing Figures

AIR LIFT PUMP ENERGY CONVERSION APPARATUS

SUMMARY OF THE INVENTION

The present invention is directed to a novel apparatus for pumping water up through a tube by a succession of coherent air bubbles, each of which extends completely across the interior of the tube as it rises up the tube. The upwardly flowing water operates a fluid motor device, preferably a turbine or the like, whose water-driven rotation may be used for generating electricity or for other purposes.

In accordance with the presently preferred embodiment of the invention, the present apparatus comprises a vertically elongated, open ended lift tube which extends down into a body of water from an upper end which is below the water level. Near its lower end the lift tube holds concentrically a smaller diameter, much shorter inner tube and a transverse partition extending between the two tubes above the lower end of the inner tube. Compressed air is introduced into the space between the two tubes below this transverse partition to form a coherent air bubble which forces water down from this space into the inner tube at its lower end. This air bubble then enters the inner tube at its lower end, rising up the inner tube and passing from the upper end of the inner tube into the lift tube as a coherent air bubble which extends completely across the interior of the lift tube.

The lift tube has a water inlet opening located above the transverse partition and below the upper end of the inner tube, so that additional water may be drawn into the lift tube through this opening by the rising air bubble.

Preferably, several such lift tubes are supported side by side in the water below a chamber into which all of the lift tubes discharge upwardly flowing water. The air bubbles break up at the lower end of this chamber. A rotary turbine-like device in this chamber is driven by the upwardly flowing water discharged from the upper ends of the several lift tubes. This turbine may drive an electrical generator or alternator or any other mechanically driven device for doing work.

A principal object of this invention is to provide a novel and improved apparatus for driving a fluid motor, preferably a turbine-like device, by an upward flow of water which is pumped up by bubbles of a suitable gaseous medium, preferably compressed air.

Another object of this invention is to provide a novel air lift pump for pumping water up through a tube from a lower level to a higher level.

Another object of this invention is to provide such an air lift pump which has a novel arrangement for forming an air bubble at the lower end of a lift tube which remains coherent and extends completely across the inside of the lift tube as it rises up the latter to pump water upwardly through the lift tube.

Another object of this arrangement is to provide an air lift pump as just stated having a novel water inlet arrangement near its lower end for adding to the supply of water which enters the lift tube in response to the pumping action of the rising air bubbles.

Further objects and advantages of this invention will be apparent from the following detailed description of a presently preferred embodiment thereof, which is shown in the accompanying drawings, in which.

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

Figure 1:
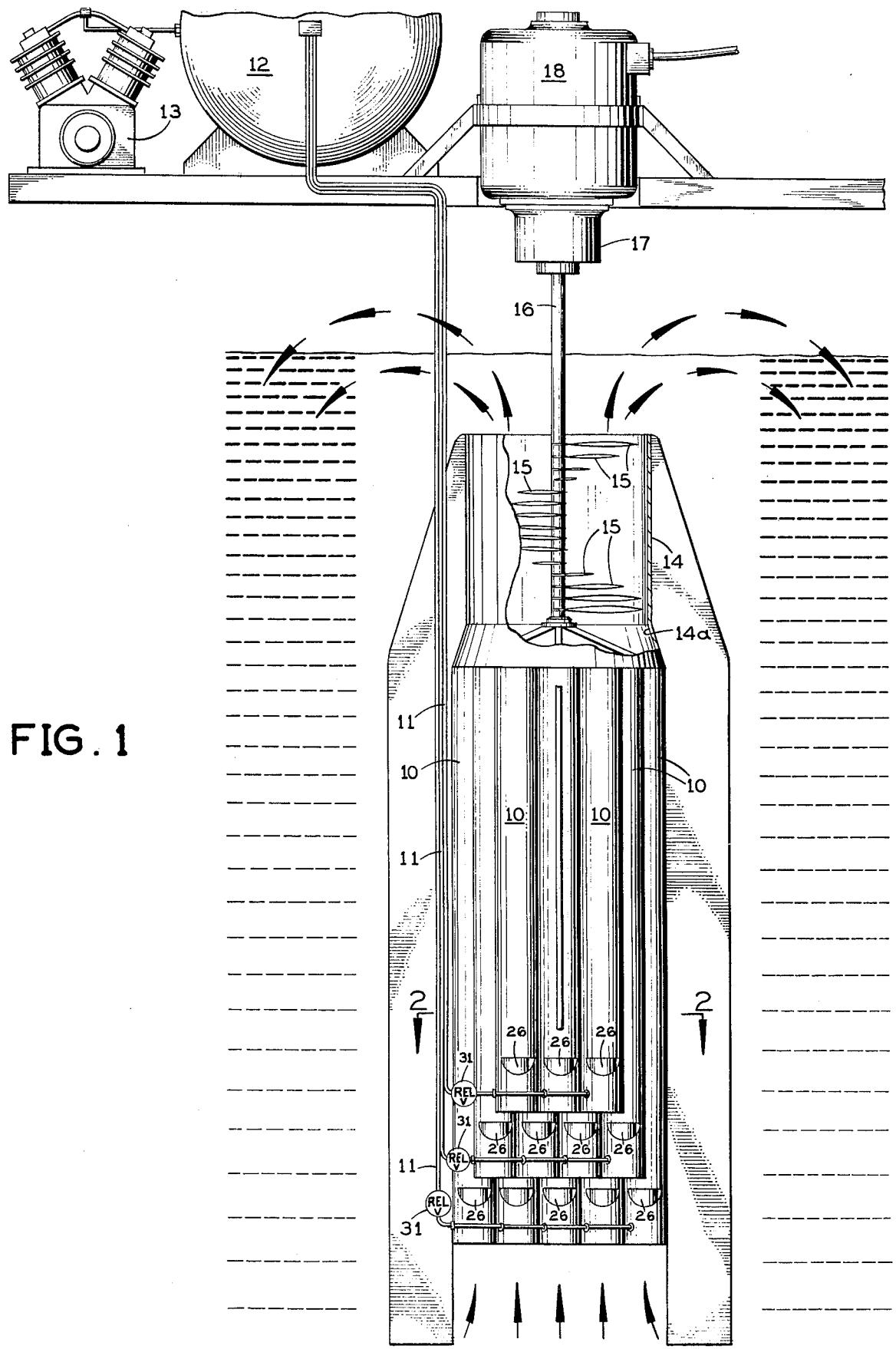
FIG. 1 is an elevational view of the present apparatus with parts broken away for clarity and other parts shown schematically.

Referring to FIG. 1, in broad outline the present apparatus comprises a cluster of open ended, vertical lift tubes 10 immersed completely in a body of water, a plurality of air lines 11 leading down to these lift tubes from a tank 12 of compressed air which is filled by an air compressor 13, an open-ended hood 14 positioned below the water level and extending around the upper ends of the clustered lift tubes 10, and a fluid motor presenting a plurality of blades or vanes 15 inside this hood on a vertical shaft 16 whose upper end is coupled through a gear reduction unit 17 to an electric generator or alternator 18 of known design.

Figure 2:
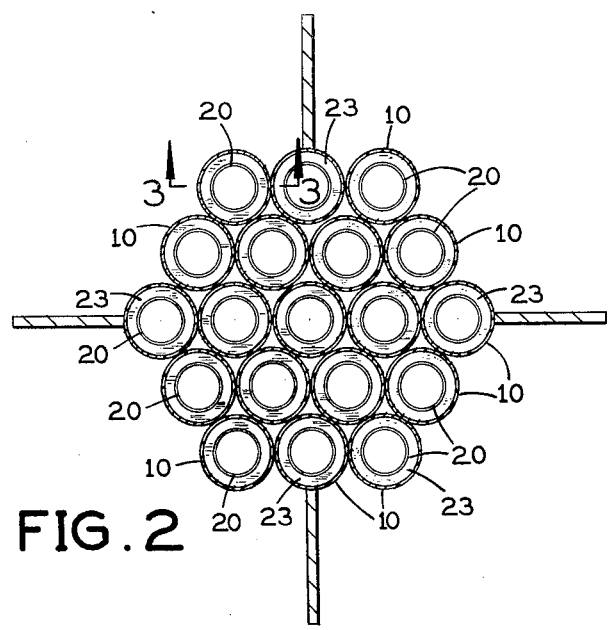
FIG. 2 is a horizontal cross-section taken along the line 2—2 in FIG. 1.

Referring to FIG. 2, in one practical embodiment the cluster of lift tubes 10 has nineteen such tubes arranged in contiguous rows of three, four, five, four and three, respectively. The individual lift tubes may abut against each other or they may be spaced apart. The lift tubes are held rigidly in this cluster by a support framework (not shown). Preferably, as shown the lift tubes 10 extend vertically in the water.

Figure 3:
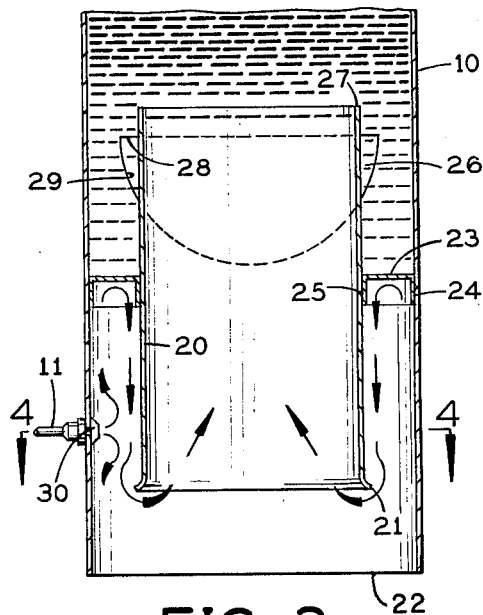
FIG. 3 is an enlarged fragmentary vertical section taken along the line 3—3 in FIG. 2 at the lower end of one of the lift tubes in this apparatus.
Figure 4:
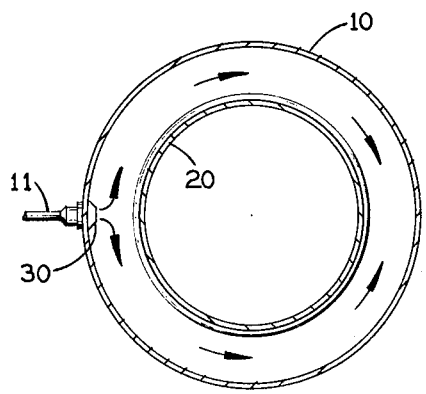
FIG. 4 is a horizontal cross-section taken along the line 4—4 in FIG. 3.

Referring to FIG. 3, each lift tube 10 is the outer tube of an individual pump unit which also has a much shorter, smaller diameter inner tube 20 positioned concentrically inside the outer tube 10 near the lower end of the latter. The inner tube has an outwardly and downwardly flared open bottom end 21 which is spaced above the open bottom end 22 of the outer tube. A transverse partition 23 extends across the annular space between the outer and inner tubes about midway along the length of the inner tube. This partition has depending outer and inner flanges 24 and 25 which are suitably fastened respectively to the inside of the outer tube 10 and the outside of the inner tube 20 so that the partition provides a horizontal, annular, fluid-tight barrier between the two tubes.

The lift tube 10 is formed with relatively large opening 26 which is located completely above the partition 23 and below the open upper end 27 of the inner tube 20. In the particular embodiment shown this opening is generally semi-circular in elevation, presenting a horizontal top edge 28 whose opposite ends are intersected by a curved bottom edge 29.

The respective air line 11 for each lift tube is connected to a fitting 30 which extends through the lift tube 10 at a location spaced below the transverse partition 23 and above the bottom edge 21 of the inner tube 20.

As shown in FIG. 1, the open lower ends of the lift tubes 10 in the cluster are offset vertically from one another. For example, as shown, each outer row of three lift tubes has the lower ends of these tubes at a higher elevation than those of the adjoining row of four lift tubes, and the five lift tubes in the middle row have their lower ends farther down than the adjoining rows of four lift tubes each. All of the lift tubes 10 in the cluster have their lower ends spaced above the bottom of the body of water in which this pumping system is located, such as a large tank of water.

As shown schematically in FIG. 1, a relief valve 31 is connected in the air line 11 ahead of the inlet fitting 30 for each lift tube or several of the lift tubes. The valves 31 may be timer-operated to open and close according to a predetermined timing sequence. If all are opened at the same time, or if a single valve 31 is provided above ground for all the lift tubes 10, the differing lengths of the lift tubes will cause the simultaneously started air bubbles to leave the upper ends of the different length tubes at different times to even out the water pumping operation. The capacity of the air supply system (the air compressor 13 and the storage tank 12) must be large enough that the air pressure at the inlet side of each valve 31 will always be sufficiently higher than the fluid pressure at its outlet side.

In the operation of each pump unit, initially the annular space below the partition 23 between the lift tube 10 and the inner tube 20 is filled with water which enters the bottom of the lift tube. When the corresponding air valve 31 is opened, it remains open long enough to introduce a charge of compressed air into this annular space, which displaces the water which previously filled this space. The next time the air valve is opened, this stored annular volume of compressed air is forced down out of this annular space and up into the inner tube 20 where it forms a coherent compressed air bubble which extends completely across the interior of the inner tube. Such a bubble is shown at B in FIG. 5. Preferably, the axial length of this bubble as it rises up inside the inner tube 20 is almost equal to the length of this tube.

The rising air bubble pushes up water ahead of it and draws in water from behind. Thus, as the air bubble rises up inside the inner tube, water is drawn in through the open bottom end of the lift tube 10 and this water flows up through the inner tube 20 behind the rising air bubble.

Figure 6:
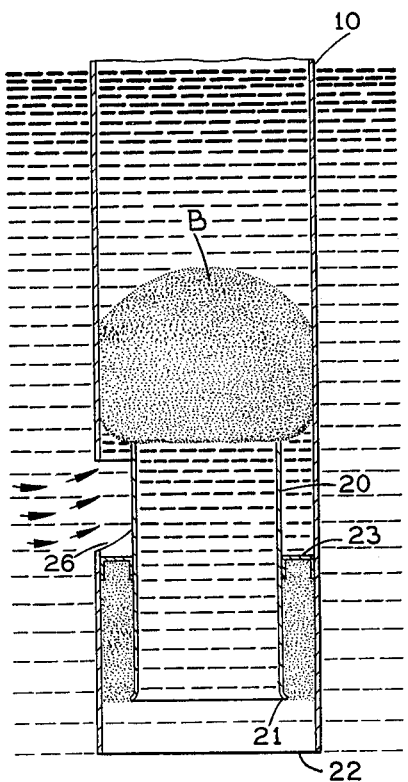
FIG. 6 is a similar view showing the air bubble rising up the lift tube after leaving the upper end of the inner tube.

As the coherent air bubble B emerges from the open upper end of the inner tube 20, it expands laterally over to the sidewall of the lift tube 10, remaining coherent and completely filling the interior of the outer tube, as shown schematically in FIG. 6. As this coherent, pressurized air bubble rises up the lift tube it draws additional water into the lift tube through the opening 26 in the latter. No air escapes through this opening because its top edge is below the open upper end of the inner tube 20 through which the coherent air bubble enters the lift tube.

Figure 7:
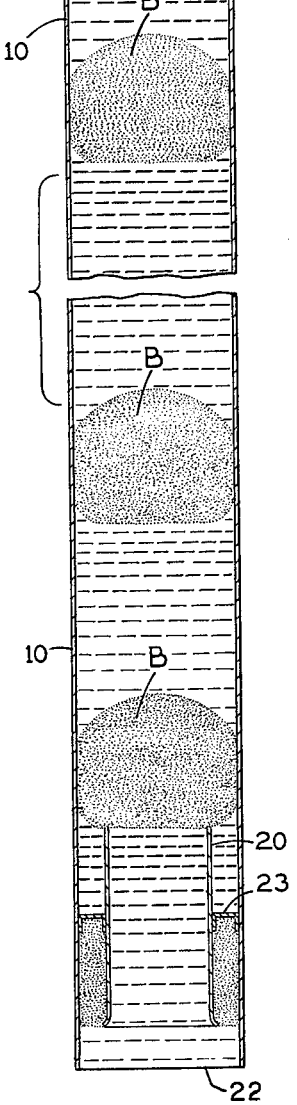
FIG. 7 is an elevational view showing a series of air bubbles rising up through the lift tube in the operation of this apparatus.

FIG. 7 illustrates a series of discrete coherent air bubbles rising up inside the lift tube, each air bubble having been developed by a corresponding opening and closing of the air valve 31 connected to that lift tube. Preferably, the air bubbles flow up the lift tube at a predetermined, even repetitive rate-that is, with a uniform time interval between successive air bubbles.

The upper ends of the clustered lift tubes 10 discharge into the open-ended hood 14, the air bubbles and the water pushed up ahead of the bubbles and that drawn in behind each air bubble flowing into said hood. The large air bubbles are broken up in the lower end of the hood as they emerge from the respective lift tubes 10. The upward flow of water behind each air bubble tends to force the air laterally outward and break it up into small air bubbles against the side of the hood 14 while the water flows up through the middle of the hood. The lower end of the hood tapers laterally inward and upward to enhance the upward water flow.

The shaft 16 carries a plurality of angularly offset vanes or blades 15 which are acted upon by the upwardly-flowing water to impart rotation to the shaft in a predetermined direction. The rotating shaft drives the rotor of the generator or alternator 18 through the gear reduction 17, thereby converting the energy of the upward flow of water into electrical energy.

After flowing up past the blades or vanes 15 the water escapes from the upper end of the hood 14 in the form of a laterally outwardly expanding, conically flared plume, as indicated by the arrows in FIG. 1. Under typical operating conditions this plume of upwardly flowing water disturbs the surface of the body of water in which this apparatus is immersed.

In one practical embodiment of this apparatus, each lift tube 10 has a 12 inch insided diameter. In the 19-tube assembly shown in FIGS. 1 and 2, the longest lift tubes (the five in the middle row) are about 13 feet long, the shortest lift tubes (the three in each outer row) are about 10 feet long, and the intermediate lift tubes (the four in each intermediate row) are about 11.5 feet long. As shown in FIG. 1, the water inlet ports 26 in the lift tubes of each intermediate (four-tube) row are located below the bottom edges of the lift tubes in the adjacent outer (three-tube) row. Also, the water inlet ports 26 in the lift tubes of the middle (five-tube) row are located below the bottom edges of the lift tubes in each intermediate (four-tube) row.

Figure 5:
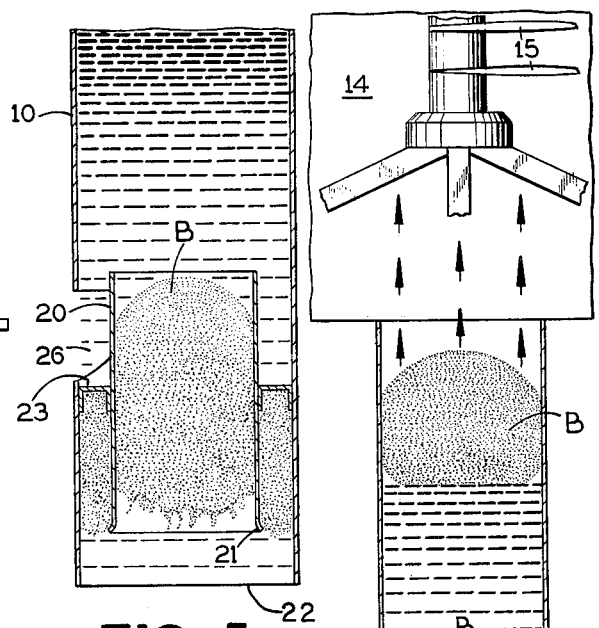
FIG. 5 is a view similar to FIG. 3 showing a coherent air bubble rising up through the inner tube at the lower end of the lift tube.

The length and diameter of the inner tube 20 and the location of the partition 23 along the inner tube preferably are chosen so that the volume of the inner tube is substantially equal to the volume of the annular space bounded on the outside by the lift tube 10, on the top by the partition 23, on the inside by the inner tube 20, and on the bottom by the bottom edge 21 of the inner tube. With these proportions this annular space will trap an air bubble which is large enough to fill the inner tube 20 substantially completely, as shown in FIG. 5.

In this embodiment of the apparatus, the inwardly and upwardly tapered lower end section 14a of the hood has a vertical height of about 12 inches, and the remainder of this hood (which is cylindrical) has a vertical height of about 52 inches and an inside diameter of about 52 inches. The top of the hood preferably is about 3 feet below the surface of the water. With this arrangement, the open bottom ends of the lift tubes 10 will be at different levels about 15 to 18 feet below the surface of the water.

In the operation of this apparatus (considering just one lift tube at a time), the air bubble immersed in the water has every part of its surface pressed by the water, and the resultant of all these forces is an upward buoyant, or lift, force. The rising air bubble is contained by the sidewall of the lift tube 10 as it rises inside the lift tube, and as it moves upward the air bubble is replaced by water. The air bubble is acted on by a lift force equal to the weight of the water displaced by the air bubble.

In the present apparatus, the relatively small diameter of each lift tube 10 insures that the velocity of the water flow up through the lift tube will be high enough for very efficient pumping operation. In addition, the pumping efficiency depends upon the frequency with which the discrete air bubbles B are formed and rise up the lift tube and this of course, depends upon the tube diameter, given the operating condition that each air bubble must be large enough to extend completely across the inside of the lift tube. Because each air bubble extends completely across the interior of the lift tube the water above it can only be displaced vertically, and not laterally, by the rising air bubble and therefore the water-displacing, pumping efficiency is high in the present apparatus.

A high rate of air bubble formation is advantageous because as the air bubble frequency is reduced, more energy is absorbed in accelerating the water which is displaced by this air bubble, and therefore the pumping efficiency drops off. In addition, there should be at least two vertically spaced, discrete air bubbles inside each lift tube at any instant to avoid water fall back into the lift tube after an air bubble emerges from its upper end. Preferably, for optimum efficiency the air bubbles should be produced at a substantially uniform rate so that the speed of the turbine shaft 16 will not fluctuate appreciably.

I claim:

1. In a pump having an elongated open-ended lift tube mounted to extend upward in a body of water, means for introducing a compressed gaseous fluid into said lift tube at a predetermined location near its lower end, and means for trapping said compressed gaseous fluid at the lower end of said lift tube until enough of said gaseous fluid accumulates to form a coherent bubble large enough to extend completely across the inside of said lift tube as it rises up the lift tube, the improvement wherein said trapping means comprises:

an open-ended inner tube extending up inside said lift tube near the latter's lower end, said inner tube extending down below said predetermined location where the gaseous fluid is introduced into said lift tube;

and a transverse partition extending between said inner tube and said lift tube above said predetermined location where the gaseous fluid is introduced into the lift tube, whereby to trap said gaseous fluid between said tubes below said partition to form a coherent bubble which enters the lower end of said inner tube and rises up the latter before passing into the lift tube.

2. A pump according to claim 1, wherein said lift tube has an opening therein above said partition and below the upper end of said inner tube for passing water into the lift tube.

3. A pump according to claim 2, wherein said gaseous fluid is compressed air.

4. A pump according to claim 3 in combination with fluid motor means positioned above the upper end of said lift tube to be operated by the upward flow of water thereat.

5. The combination of claim 4, wherein said fluid motor means is a turbine-like device with a vertical shaft and a plurality of vanes operatively arranged on said shaft to be impinged upon by the upwardly flowing water for imparting rotation to said shaft.

6. The combination of claim 5, and further comprising an open-ended hood at the upper end of said lift tube receiving said shaft and said vanes, said hood tapering inwardly and upwardly at its lower end.

7. The combination of claim 5, wherein the volume of said inner tube is substantially equal to the volume of the space between said lift tube and said inner tube below said partition.

8. An energy conversion apparatus comprising:

a plurality of lift tubes mounted to extend side by side substantially vertically immersed in a body of water;

means for introducing compressed air into said lift tubes at their lower ends;

means in each lift tube at its lower end for trapping compressed air to form a bubble large enough to extend completely across the inside of the lift tube tube as it rises up the lift tube;

an open-ended hood extending across the upper ends of the lift tubes;

and a turbine-like device having a vertical shaft and vanes positioned on said shaft inside said hood below the water level to be impinged upon by the upward flow of water from said lift tubes.

9. An apparatus according to claim 8, wherein said trapping means in each lift tube comprises:

an open-ended inner tube extending up inside said lift tube near the latter's lower end, said inner tube extending down below said predetermined location where the compressed air is introduced into said lift tube;

and a transverse partition extending between said inner tube and said lift tube above said predetermined location where the compressed air is introduced into the lift tube, whereby to trap said compressed air between said tubes below said partition to form a coherent bubble which enters the lower end of said inner tube and rises up the latter before passing up into the lift tube.

10. An apparatus according to claim 9, wherein each lift tube has a water inlet opening therein above the corresponding partition and above the upper end of the corresponding inner tube.

11. An apparatus according to claim 10, wherein the lower ends of adjoining lift tubes are at different levels in the water, and said water inlet openings in said adjoining lift tubes are at different levels in the water.

12. An apparatus according to claim 9, wherein the lower end of said hood tapers inwardly in an upward direction immediately above the upper ends of the lift tubes.

* * * * *